United States Patent
Forster

(10) Patent No.: US 9,172,130 B2
(45) Date of Patent: Oct. 27, 2015

(54) RFID INLAY INCORPORATING A GROUND PLANE

(71) Applicant: Avery Dennison Corporation, Pasadena, CA (US)

(72) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/798,557

(22) Filed: Mar. 13, 2013

(65) Prior Publication Data

US 2014/0263655 A1    Sep. 18, 2014

(51) Int. Cl.
| | |
|---|---|
| G06K 7/08 | (2006.01) |
| G06K 19/06 | (2006.01) |
| H01Q 1/22 | (2006.01) |
| H01Q 1/38 | (2006.01) |
| H01Q 9/40 | (2006.01) |

(52) U.S. Cl.
CPC .............. *H01Q 1/2225* (2013.01); *H01Q 1/38* (2013.01); *H01Q 9/40* (2013.01)

(58) Field of Classification Search
USPC ........................................ 235/451, 488, 492
See application file for complete search history.

(56) References Cited

U.S. PATENT DOCUMENTS

| | | | |
|---|---|---|---|
| 6,049,314 A | 4/2000 | Munson | |
| 6,133,883 A | 10/2000 | Munson | |
| 7,205,899 B2 | 4/2007 | Surkau | |
| 7,298,330 B2 | 11/2007 | Forster | |
| 7,573,390 B2 | 8/2009 | Nagao | |
| 7,683,785 B2* | 3/2010 | Johnson | 340/572.1 |
| 8,072,334 B2 | 12/2011 | Forster | |
| 2003/0016133 A1* | 1/2003 | Egbert | 340/572.7 |
| 2007/0080233 A1* | 4/2007 | Forster et al. | 235/492 |
| 2008/0122631 A1* | 5/2008 | Kodukula et al. | 340/572.8 |
| 2009/0051614 A1 | 2/2009 | Wong | |
| 2009/0160653 A1 | 6/2009 | Yeh et al. | |
| 2010/0109961 A1 | 5/2010 | Surkau | |
| 2010/0296225 A1* | 11/2010 | Smith et al. | 361/311 |
| 2011/0147467 A1 | 6/2011 | Choi | |
| 2011/0279326 A1 | 11/2011 | Dokai et al. | |
| 2012/0235870 A1 | 9/2012 | Forster | |
| 2012/0318874 A1* | 12/2012 | Germann et al. | 235/492 |
| 2013/0193215 A1* | 8/2013 | Mingle et al. | 235/492 |

FOREIGN PATENT DOCUMENTS

| | | |
|---|---|---|
| EP | 2400435 | 12/2001 |
| EP | 1895620 | 3/2008 |
| EP | 2535849 | 12/2012 |

OTHER PUBLICATIONS

International Search Report dated Jul. 10, 2014 for International Application No. PCT/US2014/023593.

* cited by examiner

*Primary Examiner* — Tuyen K Vo
(74) *Attorney, Agent, or Firm* — Avery Dennison Retail Information Services LLC

(57) ABSTRACT

An RFID inlay. The RFID inlay can include a substrate having a first area and a second area, a conductive structure having a first part disposed over at least a portion of the first area and a second part disposed over at least a portion of the second area, and a dielectric material disposed over at least a portion of the conductive structure, wherein the substrate is adapted to be folded such that the first part of the conductive structure is disposed over the second part of the conductive structure and the dielectric material is disposed between the first part and the second part.

15 Claims, 8 Drawing Sheets

RFID INLAY INCORPORATING A GROUND PLANE

BACKGROUND OF THE INVENTION

The use of radio frequency identification (RFID) to identify one of a plurality of items is well known. Typical RFID tags or integrated circuits include a microprocessor, also known as a microchip, electrically connected to an antenna. Alternatively, the microchip is first attached to a pad having electrical leads that provides a larger attachment or "landing" area. This is typically referred to as a "strap" or "interposer." The strap is then attached to the antenna.

The microprocessor stores data, which can include identifying data unique to a specific item, which is transmitted to an external receiver for reading by an operator and processing of the item. RFID tags can be attached to or associated with items for inventory control, shipment control, loss prevention, and the like. RFID tags are particularly useful in identifying, tracking and controlling items such as packages, pallets, and other product containers. The location of each item can be tracked and information identifying the owner of the item or specific handling requirements, can be encoded into the chip contained in the RFID tag and later read by a scanning device or reader which is capable of decoding and displaying the information previously encoded on the chip.

Accordingly, RFID tags can be attached to or associated with items entering or within a supply chain or retail environment and the identifying information received can be processed for various reasons in a variety of manners. RFID tags are particularly useful in identifying, tracking and controlling items such as pallets, packages, consumer goods and individual product containers. However, the tuning of an RFID tag can be dependent on the contents of the container. For example, conductive materials or materials having a high dielectric constant, for example, liquids or metals, can detune an RFID tag or substantially interfere with the RFID tag. Consequently, communications with such a tag are difficult and often ineffective.

SUMMARY OF THE INVENTION

According to at least one exemplary embodiment, an RFID inlay (which is a chip connected to an antenna provided on a substrate) is disclosed. The RFID inlay can include a substrate having a first area and a second area, a conductive structure having a first part disposed over at least a portion of the first area and a second part disposed over at least a portion of the second area, and a dielectric material disposed over at least a portion of the conductive structure, wherein the substrate is adapted to be folded such that the first part of the conductive structure is disposed over the second part of the conductive structure and the dielectric material is disposed between the first part and the second part such that the first and second parts are not in contact with one another.

According to another exemplary embodiment, a RFID inlay can include a first substrate having a first conductive structure disposed thereon, a second substrate having a second conductive structure disposed thereon, the second conductive structure having a first portion and at least one second portion, and a dielectric layer disposed between the first conductive structure and the first portion of the second conductive structure, wherein the at least one second portion of the second conductive structure is capacitively coupled to the first conductive structure.

According to another exemplary embodiment, a RFID inlay can include a substrate having a first surface and a second surface, a plurality of cuts defined in the substrate so as to partition the substrate into a first area and a second area separable from the first area, a plurality of hinges coupled to the first area and the second area, a first conductive structure disposed on the first surface of the substrate and coextensive with the first area and at least a portion of the second area, and a second conductive structure disposed on the second surface of the substrate and coextensive with the first area.

According to another exemplary embodiment, an RFID inlay, is described and includes a substrate having a conductive pattern disposed thereon, with the conductive pattern having first and second portions. A dielectric layer is disposed over the conductive pattern and a transfer tape disposed over a portion of the dielectric layer. The substrate is folded over onto itself such that the first and second portions of the conductive pattern are juxtaposed over one another and separated by the dielectric layer.

Further in accordance with the foregoing exemplary embodiment, the RFID inlay wherein each of the first and second patterns have first and second longitudinal edges and first and second transverse edges. The first and second transverse edges are in substantial alignment with one another and at least one of the first and second longitudinal edges of each of the first and second patterns is out of alignment with another of the first and second edges of the first and second portions of the conductive pattern.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION OF THE INVENTION

Figure 1A:
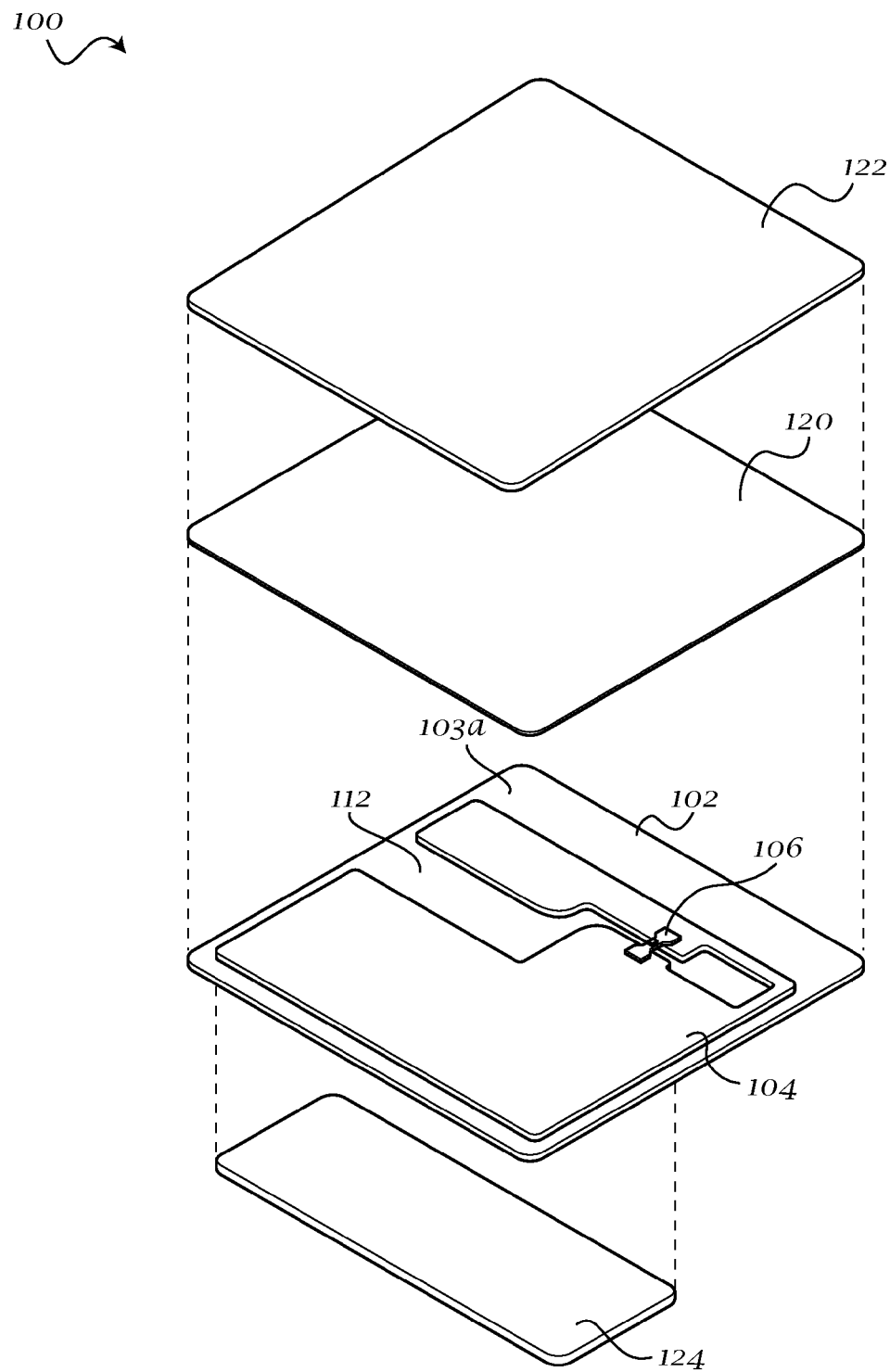
FIG. 1a is an exploded view of a first exemplary embodiment of a RFID inlay.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, an RFID inlay incorporating a ground plane is disclosed. The ground plane can interact with the antenna structure of the RFID inlay so as to mitigate the effects of RFID-unfriendly materials (metals, liquids, etc.) on the performance of the RFID inlay.

FIGS. 1a-1d show a first exemplary embodiment of an RFID inlay 100. The inlay 100 can include a substrate 102 having an antenna structure 104 disposed thereon. Substrate 102 can be any material, for example paper, coated paper, films, polyester, polyethylene terephthalate (PET), laminations of film and paper or any other suitable substrate that can be desired. Substrate 102 may be divided into a first portion 102a and a second portion 102b. Substrate 102 may have a first face 103a on which antenna structure 104 may be disposed, and a second face 103b which may be suitable for printing thereon.

As can be seen from the drawings, the substrate 102 is substantially quadrate in shape and is generally larger than the antenna structure 104 that is disposed on the substrate. That is the antenna 104 is fully contained within the perimeter of the substrate. Other geometric configurations are of course possible.

Figure 1B:
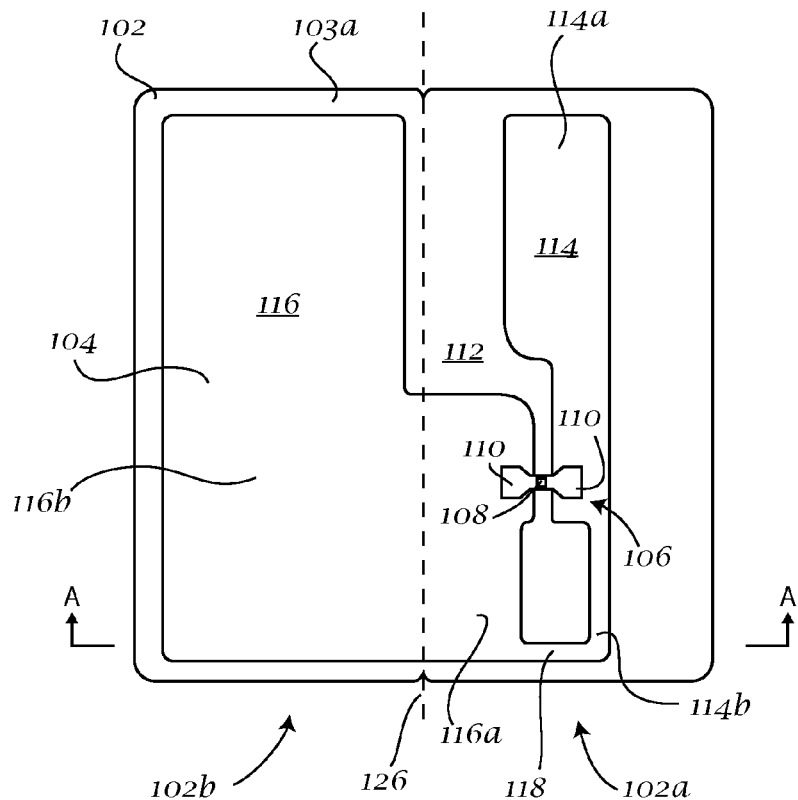
FIG. 1b is a plan view of an antenna structure and substrate of a first exemplary embodiment of a RFID inlay.

As shown in FIG. 1b, the fold line 126 runs substantially medially of the substrate such that portion 114 is has less conductive material making up the antenna portion than antenna portion 116. Strap 110 is also shown on portion 114. When folded over, portion 114 does not extend to a longitudinal end edge of portion 116 and portion 116 extends beyond the longitudinal end edge of portion 114. As can be seen from the figures, neither of the longitudinal edges of the antenna portions align with one another when the structure is folded on itself. The transverse edges of portions 114 and 116 are substantially aligned with one another.

Antenna structure 104 can be any of a variety of materials, for example aluminum, copper, silver or another thin, conductive material, for example etched or hot-stamped metal foil. Antenna structure 104 may be coupled to an RFID integrated circuit 108 that may be part of a strap or interposer 106. Strap or interposer 106 may further include conductive leads 110, 112 to facilitate coupling between antenna structure 104 and integrated circuit 108. In some embodiments, strap or interposer 106 may also include a substrate to facilitate supporting integrated circuit 108 and conductive leads 110. Coupling between antenna structure 104 and strap or interposer 106 may be a direct, conductive coupling or may be an indirect coupling, such as a capacitive or inductive coupling or any combination of conductive, capacitive and inductive coupling.

Antenna structure 104 may be a continuous, unitary layer of conductive material. A slot 112 defined in the antenna structure can partition antenna structure 104 into a first area 114 and a second area 116. First area 114 can include a radiating element 114a. For operation at UHF, radiating element 114a may be a monopole. Second area 116 of antenna structure 104 can include a first portion 116a disposed over first portion 102a of substrate 102, and a second portion 116b disposed over second portion 102b of substrate 102. In the exemplary embodiment, first area 114 and second area 116 may be conductively coupled by a bridge 118 extending between first portion 116a of second area 116 and a second end 114b of first area 114 disposed opposite the radiating element 114a. Slot 112 may also be bridged by strap or interposer 106.

An overlaminate layer 120 may be disposed over the first face 103a of substrate 102 and antenna structure 104. The overlaminate may be a film which may be formed from any suitable material, for example polyester, cellulose acetate, polyethylene, polypropylene or the like and can be adhesively applied to the substrate 102, heat bonded, sonically sealed or otherwise fused together.

Disposed over the overlaminate layer 120 may be a dielectric layer 122. Dielectric layer 122 may be coextensive with antenna structure 104 or substrate 102. In some exemplary embodiments, dielectric layer 122 may have a thickness of approximately 0.5 mm. The dielectric layer 122 may be formed from any suitable material. For example, the dielectric layer may be formed foam, such as polypropylene foam, or any other low-density structure. A thickness of approximately 0.5 mm for dielectric layer 122 is sufficiently thin to allow for the inlay 100 to be received through printing apparatuses. Furthermore, both surfaces of dielectric layer 122 may be provided with a self-adhesive coating.

In some exemplary embodiments, an adhesive layer 124 may be disposed on the second surface 103b of substrate 102. Adhesive layer 124 may be disposed such that it is positioned proximate the second portion 102b of substrate 102. Adhesive layer 124 may be any known adhesive, for example a transfer tape, and may be provided with a release layer on the exposed surface thereof.

Figure 1C:
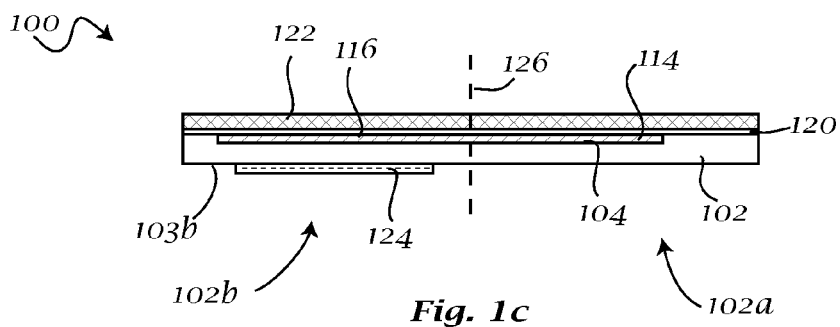
FIG. 1c is a cross-section view of a first exemplary embodiment of a RFID inlay in a flat configuration, taken along line A-A.

RFID inlay 100 may be manufactured in a roll-to-roll manufacturing process, as discussed further below. During manufacture, inlay 100 may have a flat configuration, as shown in FIGS. 1b-1c. Such a configuration can reduce issues relating to tension and stress on the inlay during the manufacturing process. However, in such a configuration, the operation of inlay 100 is likely to be sub-optimal and inefficient if inlay 100 is affixed to an object having conductive materials or materials having a high dielectric constant. To ameliorate this problem, subsequent to manufacture, RFID inlay 100 may be folded along a fold axis 126, shown in FIG. 1b, such that the first portion 102a of substrate 102 is disposed over the second portion 102b of substrate 102. In some exemplary embodiments, when folded, inlay 100 may have a thickness of about 1 mm, a length of about 21 mm and a width of about 46 mm.

Figure 1D:
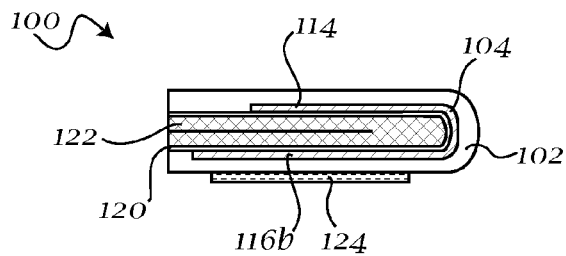
FIG. 1d is a cross-section view of a first exemplary embodiment of a RFID inlay in a folded configuration, taken along line A-A.

FIG. 1d shows an exemplary embodiment of RFID inlay 100 in a folded configuration. In the folded configuration, the second area 116b of second portion 116 of antenna structure 104 functions as a ground plane element with respect to first portion 114 of antenna structure 104. As adhesive layer 124 is used to couple inlay 100 to an object, the second area/ground plane element 116b is consequently disposed between the object and radiating element 114 when inlay 100 is in the folded configuration. The presence of a ground plane 116b between the object and radiating element 114 can mitigate the effect of conductive materials or materials having a high dielectric constant on the operation of inlay 100. Thus, inlay 100 can operate efficiently even when affixed to objects containing such materials. Furthermore, in the folded configuration, the dielectric layer 122 is disposed between the first area 114 of antenna structure 104 and the ground plane element 116b of antenna structure 104. The adhesive disposed on the face of dielectric layer 122 can serve to maintain inlay 100 in the folded configuration. Furthermore, dielectric layer 122 can serve to prevent undesired interaction between radiating element 114 and ground plane 116b.

Furthermore, in one exemplary embodiment inlay 100 can include two main tuning elements, the first of these tuning elements being radiating element 114a. The second tuning element can be a loop formed by the combination of strap 106 and bridge 118. If the total thickness of the substrate drops when inlay 100 is folded, radiating element 114a can act to decrease the radio frequency radiated from antenna structure 104, while the loop can act to increase the radio frequency radiated from antenna structure 104. Consequently, the tuning elements can serve to stabilize the operating point of inlay 100 against variations in the gap between radiating element 114 and ground plane 116 caused by manufacturing tolerances and the properties of the materials used.

Also as shown in FIG. 1d each of the first and second patterns 114, 116 have first and second longitudinal edges and first and second transverse edges (see FIG. 1 b) and wherein the first and second transverse edges are in substantial alignment with one another and at least one of the first and second longitudinal edges of each of the first and second patterns 114, 116 is out of alignment with another of the first and second edges of the first and second portions of the conductive pattern.

Figure 2A:
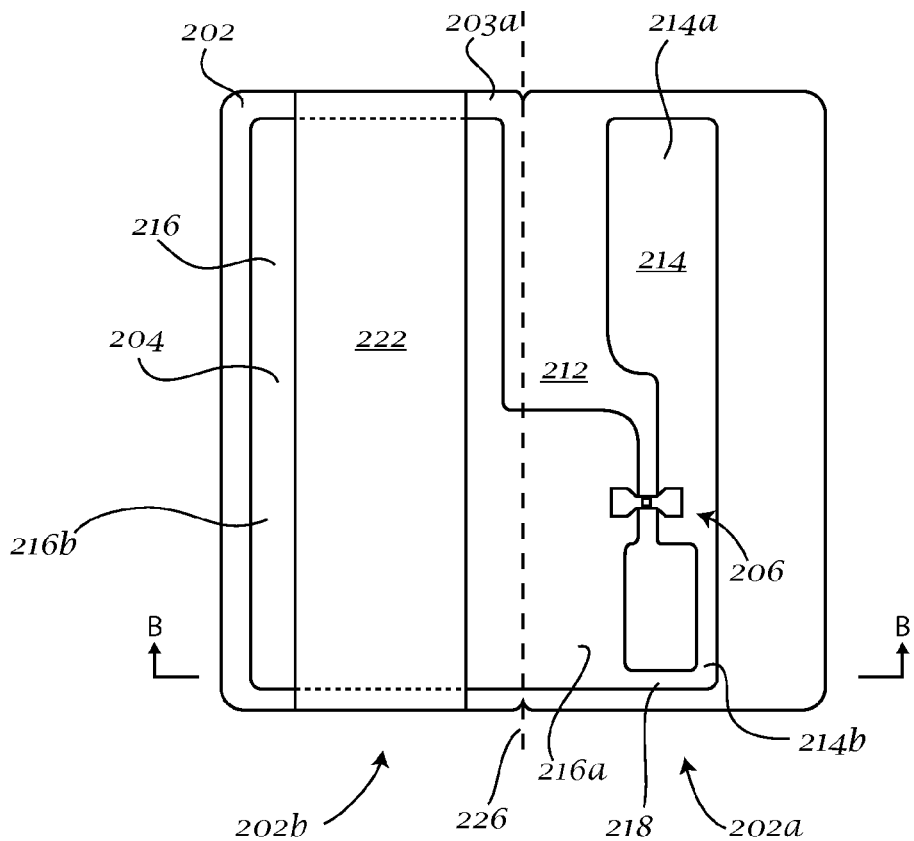
FIG. 2a is a plan view of an antenna structure, substrate, and dielectric layer of a second exemplary embodiment of a RFID inlay.
Figure 2B:
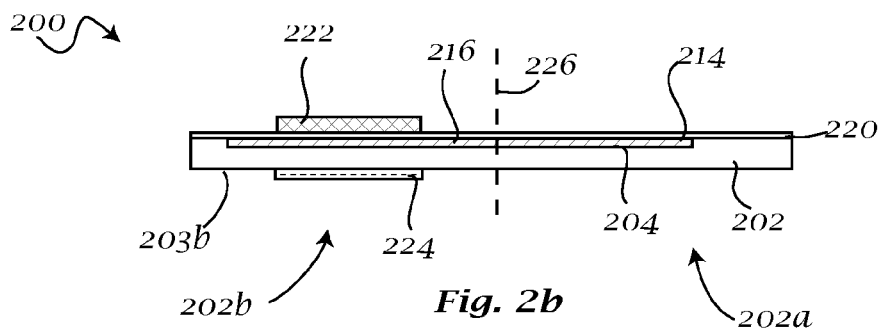
FIG. 2b is a cross-section view of a second exemplary embodiment of a RFID inlay in a flat configuration, taken along line B-B.
Figure 2C:
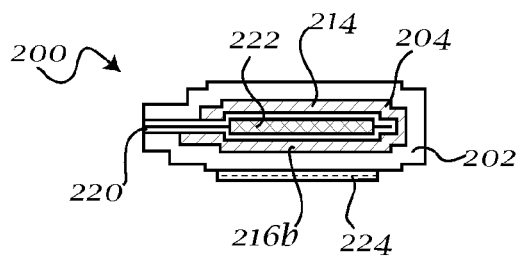
FIG. 2c is a cross-section view of a second exemplary embodiment of a RFID inlay in a folded configuration, taken along line B-B.

FIGS. 2a-2c show a second exemplary embodiment of RFID inlay 200. For convenience of illustration, substantially similar elements to those in the first exemplary embodiment of inlay 100 are represented by similar numerals, with the leading digit incremented to 2. Thus, a detailed description of the similar elements may be omitted. The second exemplary embodiment has substantially similar structure and functionality to the first exemplary embodiment, except for the features described below.

In the second exemplary embodiment of inlay 200, disposed over the overlaminate layer 220 may be a dielectric layer 222. Dielectric layer 222 may overlap a portion of substrate 202 and antenna structure 204, as shown in FIGS. 2a-2b. In some exemplary embodiments, dielectric layer 222 may have a thickness of approximately 0.5 mm. When inlay 200 is in a folded configuration, as shown in FIG. 2c, radiating element 214 and the loop formed by bridge 218 and strap 206 are over dielectric layer 222 to ensure correct operation of the antenna.

Figure 3A:
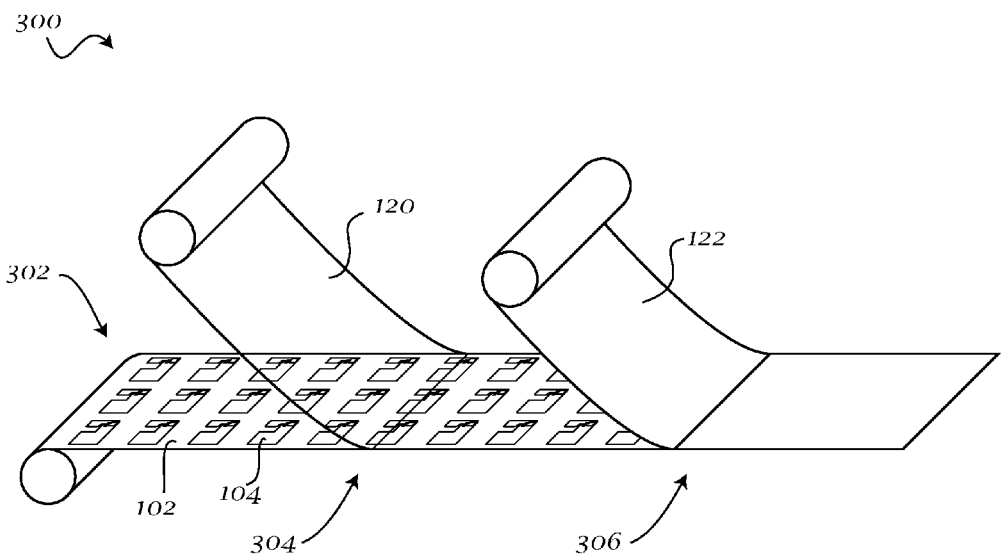
FIGS. 3a-3b show a first exemplary manufacturing process for a RFID inlay.
Figure 3B:
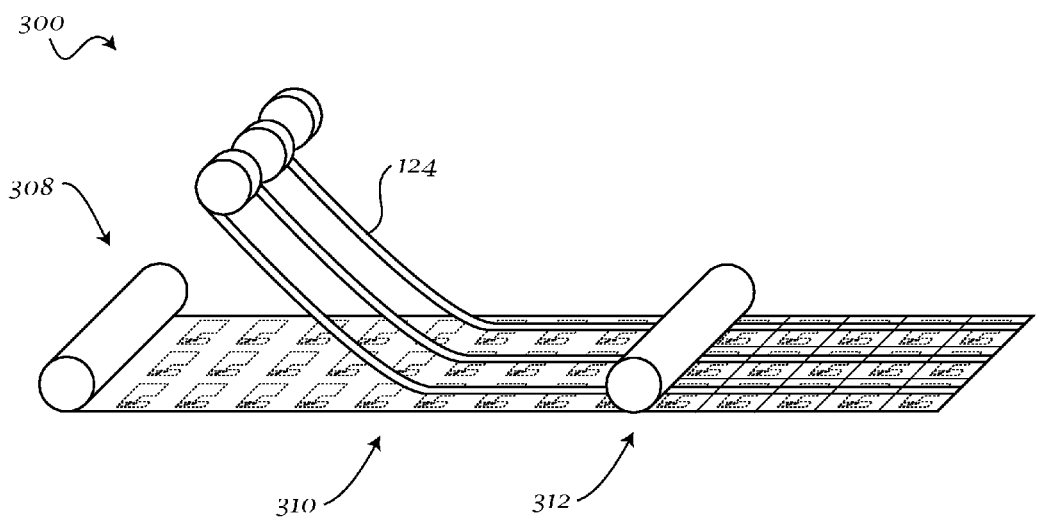

FIGS. 3a-3b show an exemplary schematic of a manufacturing process 300 for the embodiments of inlay 100, 200. The schematic illustrates a web to facilitate a roll to roll or continuous process. At step 302, substrate media 102 having a plurality of antenna structures 104 disposed on a first surface 102b of the web thereof may be provided. The substrate media may be any suitable material, such as paper or film and as shown in the figure is provided in a continuous format. It should be understood that practice of this invention may also be done in a cut sheet configuration.

At step 304, an overlaminate layer 120 may be applied to the first surface of the substrate, on which the antenna structures 104 are disposed. At step 306, a layer of dielectric material 122, such as foam, may be applied over the overlaminate layer. The dielectric material may be applied as a sheet or as strips, depending on the embodiment of the inlay that is being manufactured. Alternatively, the dielectric and overlaminate may be previously die cut such that upon attachment and alignment over the designated antenna areas, the matrix portion can be readily stripped away leaving a substantially completed assembly on the base or carrier web. Otherwise, the die cutting can occur post application such that the individual RFID inlays can be removed from the web.

At step 308, the laminated sheet resulting from step 306 is turned over with the dielectric element 122 now on the bottom of the web. At step 310, strips of transfer tape are applied to the second surface 102b of the substrate media. At step 312, the resulting laminated structure may be die cut into separate inlays. At this point, the inlays can have a flat configuration. Folding of the inlays may subsequently be performed by a suitable folding apparatus, or by an end user of the inlays. In use, the liner on the transfer tape is peeled away such that the substrate can be folded onto itself and secured. The transfer tape is only applied to one side of the RFID inlay or covers only one portion of the antenna structure.

Figure 4A:
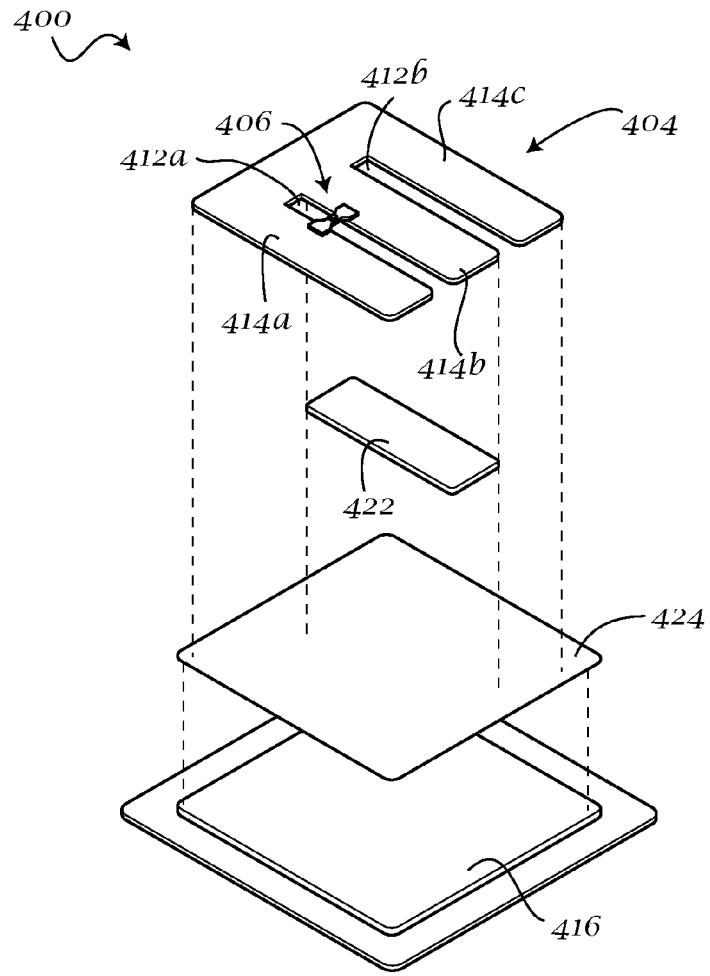
FIG. 4a is an exploded view of a second exemplary embodiment of an RFID inlay.
Figure 4B:
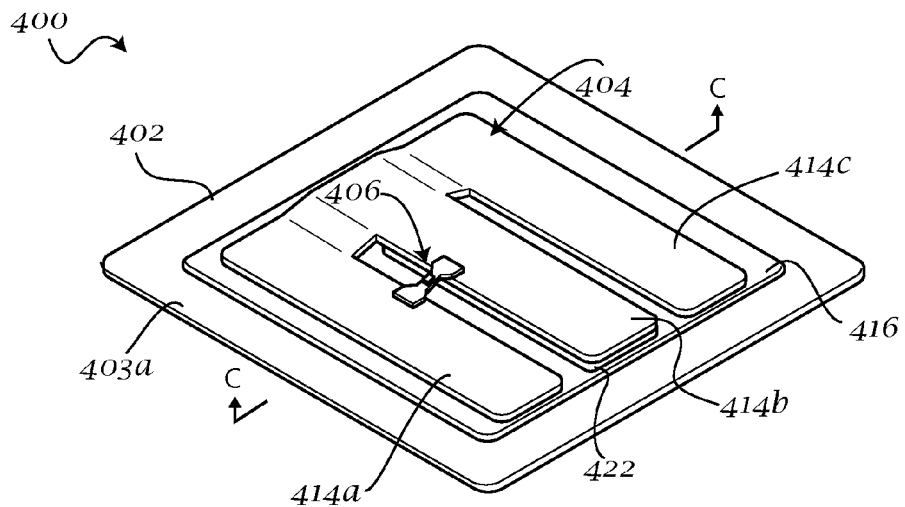
FIG. 4b is an isometric view of a second exemplary embodiment of an RFID inlay.
Figure 4C:
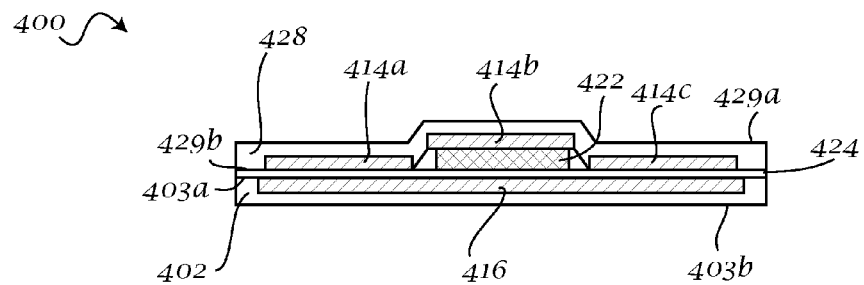
FIG. 4c is a cross-section view of a second exemplary embodiment of an RFID inlay, taken along line C-C.

FIGS. 4a-4c show a third exemplary embodiment of an inlay 400. The inlay 400 can include a substrate 402 having a ground plane 416 disposed on a first surface 403a thereof, an adhesive layer 424 disposed over the ground plane 416, an antenna structure 404 provided separately from the ground plane 416 and disposed over the adhesive layer 424, and a dielectric layer 422 disposed between a portion of the antenna structure 404 and the dielectric layer 422.

Substrate 402 can be any material, for example paper, coated paper, polyethylene terephthalate (PET), laminations of film and paper or any other suitable substrate that can be desired. A bottom surface 403b of the substrate may include an adhesive covered by a release layer so as to allow coupling of inlay 404 to a desired object.

Antenna structure 404 and ground plane 416 can be any of a variety of materials, for example aluminum, copper, silver or another thin, conductive material, for example etched or hot-stamped metal foil. Antenna structure 404 may be coupled to an RFID integrated circuit that may be part of a strap or interposer 406. Strap or interposer 406 may further include conductive leads to facilitate coupling between the antenna structure and the integrated circuit. In some embodiments, strap or interposer 406 may also include a substrate to facilitate supporting the integrated circuit and the conductive leads. Coupling between antenna structure 404 and strap or interposer 406 may be a direct, conductive coupling or may be an indirect coupling, such as a capacitive or inductive coupling.

Antenna structure 402 may be provided on a second substrate 428, shown in FIG. 4c. Similarly to substrate 402, the second substrate 428 can be any material, for example paper, coated paper, polyethylene terephthalate (PET), laminations of film and paper or any other suitable substrate that can be desired. A first surface 429a of second substrate 428 may be suitable for printing thereon, while antenna structure 402 may be disposed on a second surface 429b of the second substrate.

Antenna structure 404 and ground plane 416 may be a continuous, unitary layer of conductive material. A pair of slots 412a, 412b defined in the antenna structure can partition antenna structure 404 into three arms 414a, 414b, 414c. One of slots 412 may be bridged by strap or interposer 406 extending between a pair of adjacent arms 414. Ground plane 416 may have a non-partitioned configuration.

The dielectric layer 422 may have a length and a width substantially similar to those of an arm 414. Dielectric layer 422 may be disposed between adhesive layer 424 and an arm 414, for example central arm 414b, as in the illustrated exemplary embodiment. In some exemplary embodiments, dielectric layer 422 may have a thickness of approximately 0.5 mm. The dielectric layer 422 may be formed from any suitable material. For example, the dielectric layer may be formed foam, such as polypropylene foam, or any other low-density structure. The dielectric layer 422 can serve to separate central arm 414b from ground plane layer 416 so as to control the coupling there between in a way that facilitates operation of the structure as an antenna for the RFID device 406. Conversely, side arms 414a, 414c may be separated from ground plane layer 416 only by the adhesive layer 424, thereby resulting in a strong capacitive coupling between ground plane 416 and arms 414a, 414c.

Figure 5A:
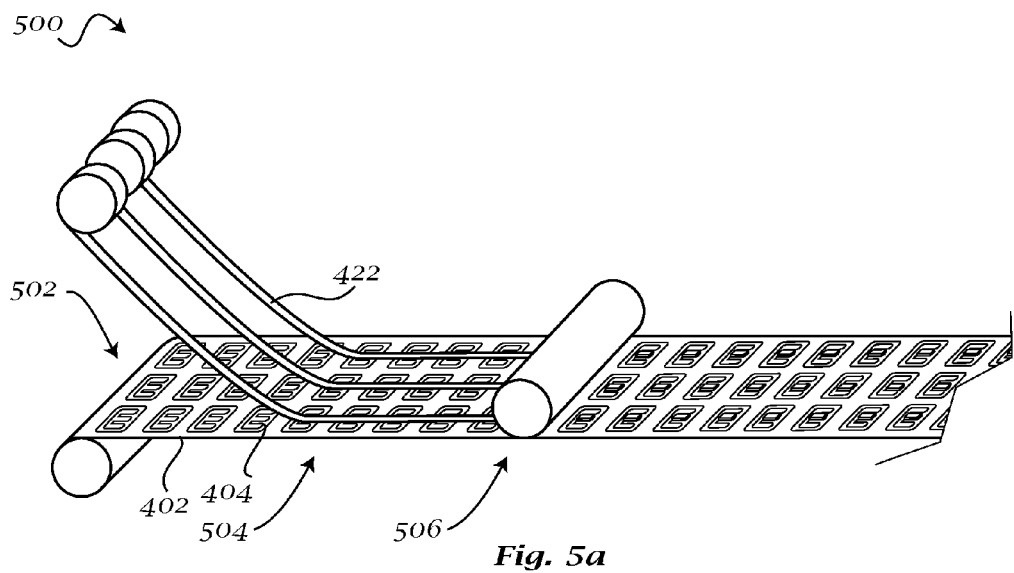
FIGS. 5a-5b show a second exemplary manufacturing process for an RFID inlay.
Figure 5B:
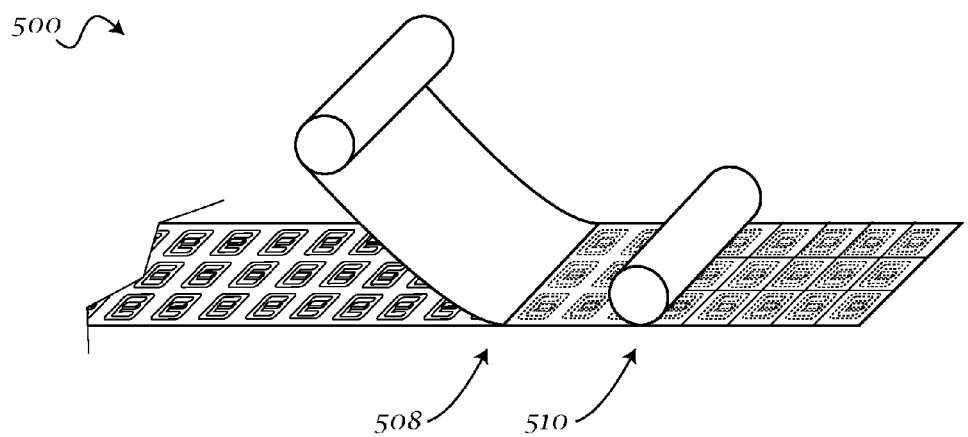

FIGS. 5a-5b show an exemplary manufacturing process 500 for the embodiments of inlay 400. At step 502, substrate media 428 having a plurality of antenna structures 404 disposed on a second surface 402b thereof may be provided. The schematic provides a web for operation in a roll to roll or continuous format. At step 504, a layer of transfer tape 422, may be applied over the substrate. The transfer tape may be applied as a sheet or as strips. At step 506, the substrate may be cut and the unwanted matrix may be stripped, thereby leaving appropriately-sized portions of the transfer tape in the appropriate position on antenna structure 404.

At step 508, substrate media 402 having a ground plane 416 disposed on a first surface 403a thereof may be applied to the sheet output from step 506. The substrate media 402 may be applied such that the first surface 403a of the substrate media 402 is facing the second surface 429b of the substrate media 428. At step 510, the resulting laminated structure may be compressed and die cut into separate inlays. The compression of the laminated structure results in the dielectric layer being pushed towards substrate media 428, thereby resulting in the configuration of inlay 400 that is shown in FIG. 4c.

FIGS. 6a-6d show a fourth exemplary embodiment of an RFID inlay 600. RFID inlay 600 can include a substrate 602, an antenna structure 604 disposed on a first surface 603a of substrate 602, and a ground plane 616 disposed on a second surface 603b of substrate 602. Substrate 602 can be any material, for example paper, coated paper, polyethylene terephthalate (PET), laminations of film and paper or any other suitable substrate that can be desired.

Antenna structure 604 and ground plane 616 can be any of a variety of materials, for example aluminum, copper, silver or another thin, conductive material, for example etched or hot-stamped metal foil. Antenna structure 604 may be coupled to an RFID integrated circuit that may be part of a strap or interposer 606. Strap or interposer 606 may further include conductive leads to facilitate coupling between antenna structure 604 and the integrated circuit. In some embodiments, strap or interposer 606 may also include a substrate to facilitate supporting the integrated circuit and conductive leads. Coupling between antenna structure 604 and strap or interposer 606 may be a direct, conductive coupling or may be an indirect coupling, such as a capacitive or inductive coupling.

Substrate 602 can be partitioned into an outer area 630 and an inner area 632. Outer area 630 may be physically separated from inner area 632 by a plurality of cuts, slits, or incisions 634 defined in substrate 602. Portions of inner area 632 may also be coupled to outer area 630 by way of hinges 636. In the illustrated embodiment, the hinges 636 may be provided at an end of inner area 632 as well as adjacent a pair of tabs 638 extending from inner portion 632. Hinges 636 may be formed by scoring or perforating substrate 602 so as to facilitate the folding thereof.

Figure 6A:
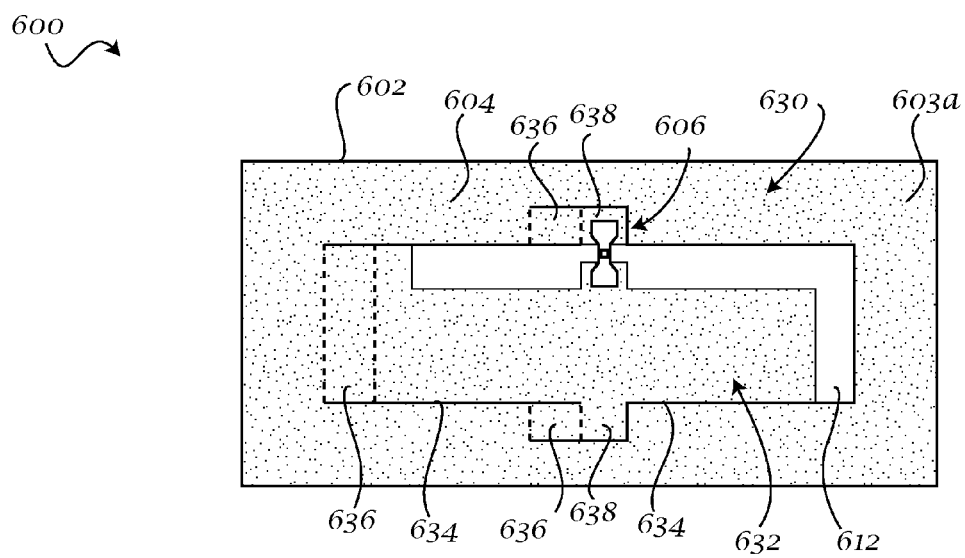
FIG. 6a is a top plan view of a third exemplary embodiment of an RFID inlay.

FIG. 6a is a top plan view of inlay 600, illustrating the configuration of antenna structure 604, which is shown as the stippled area in the figure. Antenna structure 604 may be a continuous, unitary layer of conductive material and can be substantially coextensive with the first surface 603a of substrate 602, except for a gap 612 extending along a longitudinal edge of inner area 632 and a transverse edge of inner area 632. A strap or interposer 606 can bridge gap 612. In the illustrated embodiment, strap or interposer 606 can be disposed over a tab 638 and a portion of antenna structure 604 that is disposed over inner area 632.

Figure 6B:
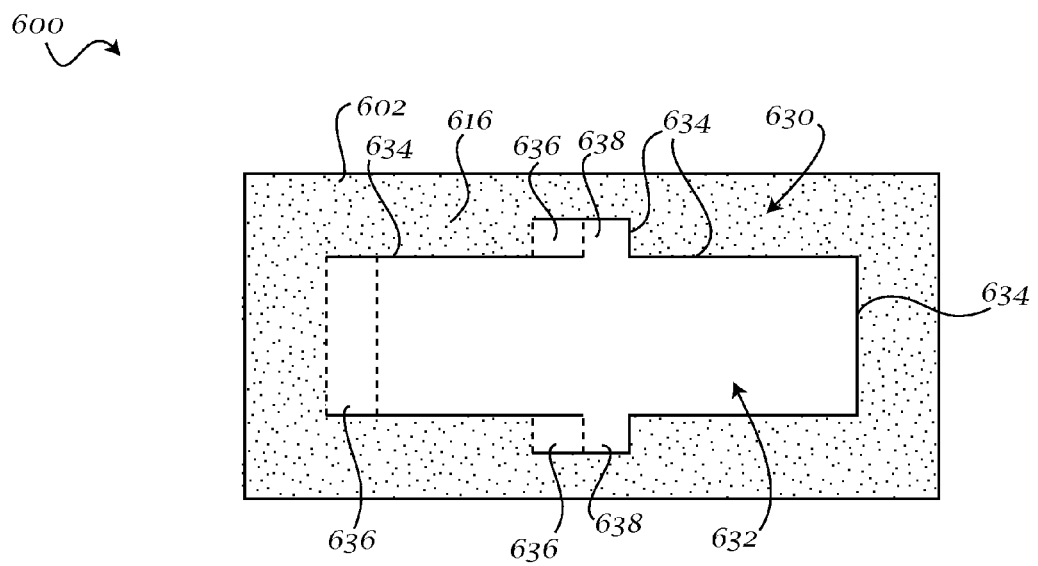
FIG. 6b is a bottom plan view of a third exemplary embodiment of an RFID inlay.

FIG. 6b is a bottom plan view of inlay 600, illustrating the configuration of ground plane 616, which is shown as the stippled area in the figure. Ground plane 616 may be a continuous, unitary layer of conductive material and can be substantially coextensive with only the outer area 630 of second surface 603b of substrate 602.

Figure 6C:
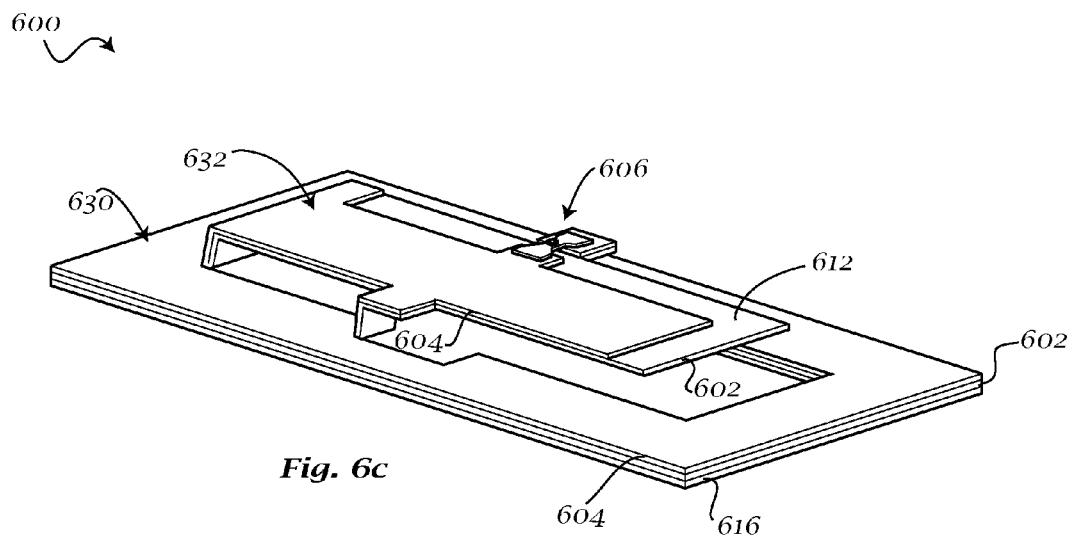
FIG. 6c is an isometric view of a third exemplary embodiment of an RFID inlay.
Figure 6D:
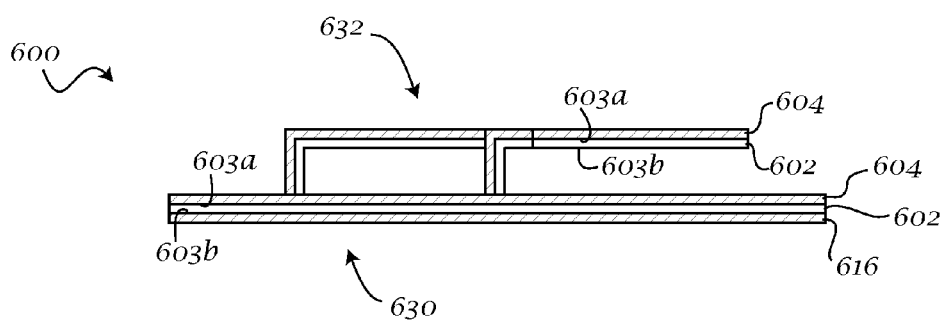
FIG. 6d is a side elevational view of a third exemplary embodiment of an RFID inlay.

Subsequent to manufacture and prior to use, inlay 600 may be substantially flat. To place inlay 600 into an operating configuration, as shown in FIGS. 6c-6d, a force may be applied to inner area 632. The hinges provided in substrate 602 can allow the inner area 632 to be vertically displaced from outer area 630. The inner area portion of antenna structure 604 consequently can act as a radiating element, while the outer area portion of antenna structure 604 is capacitively coupled to ground plane 616 and is conductively coupled to the radiating element. The vertical displacement of inner area 632 introduces a gap between the radiating element and the ground plane, thereby allowing air to act as a dielectric element for the inlay 600.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An RFID inlay, comprising:
   a substrate having a first area and a second area;
   a conductive structure having a first part disposed over at least a portion of the first area and a second part disposed over at least a portion of the second area; and
   a dielectric material disposed over at least a portion of the conductive structure;
   wherein the inlay is provided in a flat configuration and is adapted to be folded such that the first part of the conductive structure is disposed over the second part of the conductive structure and the dielectric material is disposed between the first part and the second part and the first part of the conductive structure is capacitively coupled to the second part of the conductive structure.

2. The RFID inlay of claim 1, further comprising a transfer tape disposed over one of the first and second areas.

3. The RFID inlay of claim 1, wherein transverse edges of each of the first and second parts are in alignment with one another and longitudinal edges of the first and second portions are not in alignment with one another.

4. The RFID inlay of claim 1, wherein the dielectric layer is a foam and has a thickness of about 0.5 mm.

5. The RFID inlay of claim 1, wherein the first part of the conductive structure comprises a radiating element.

6. The RFID inlay of claim 5, wherein the radiating element is a monopole.

7. The RFID inlay of claim 1, further comprising an overlaminate layer disposed between the conductive structure and the dielectric layer.

8. An RFID inlay, comprising:
a first substrate having a first conductive structure disposed thereon;
a second substrate having a second conductive structure disposed thereon, the second conductive structure having a first portion and at least one second portion wherein the first portion and the second portion of the second conductive structure are coupled by a bridge wherein the first portion of the second conductive structure comprises a radiating element such that the radiating element is a monopole; and
a dielectric layer disposed between the first conductive structure and the first portion of the second conductive structure;
wherein the at least one second portion of the second conductive structure is capacitively coupled to the first conductive structure.

9. The RFID inlay of claim 8, the first conductive structure and the second conductive structure each further comprising a slot.

10. The RFID inlay of claim 8, including a transfer tape applied over a portion of the dielectric layer.

11. The RFID inlay of claim 8, further comprising an overlaminate layer disposed between the conductive structure and the dielectric layer.

12. An RFID inlay, comprising:
a substrate having a first surface and a second surface;
a plurality of cuts defined in the substrate so as to partition the substrate into a first area and a second area separable from the first area;
a plurality of hinges coupled to the first area and the second area;
a first conductive structure disposed on the first surface of the substrate and coextensive with the first area and at least a portion of the second area;
a second conductive structure disposed on the second surface of the substrate and coextensive with the first area wherein both the first and the second conductive structure have at least two tuning elements wherein a portion of the first conductive structure that is disposed on the first area is capacitively or conductively coupled to the second conductive structure.

13. The RFID inlay of claim 12, wherein the second area is displaceable form the plane of the first area so as to introduce a dielectric separation between a portion of the first conductive structure that is disposed on the second area and the second conductive structure.

14. The RFID inlay of claim 12, wherein a portion of the first conductive structure that is disposed on the second area comprises a radiating element.

15. The RFID inlay of claim 14, wherein the radiating element is a monopole.

* * * * *